United States Patent
Risley et al.

[15] 3,642,581
[45] Feb. 15, 1972

[54] FERMENTATION PROCESS

[72] Inventors: Hugh A. Risley; Charles T. Goodhue, both of Rochester, N.Y.

[73] Assignee: Eastman Kodak Company, Rochester, N.Y.

[22] Filed: Dec. 31, 1969

[21] Appl. No.: 889,713

[52] U.S. Cl. ............................................195/49, 195/114
[51] Int. Cl. ............................................................C12c 1/00
[58] Field of Search....................195/30, 49, 51, 59, 80, 114

[56] References Cited

UNITED STATES PATENTS 3,558,431  1/1971  Goodhue et al. ..........................195/49

OTHER PUBLICATIONS

Shapashnikov et. al. Chemical Abstracts Vol. 67, No. 88 4812, 1967

Primary Examiner—A. Louis Monacell
Assistant Examiner—Gary M. Nath
Attorney—William H. J. Kline, Bernard D. Wiese and Allen P. Rosenberg

[57] ABSTRACT

An improved method for the microbiological oxidation of organic compounds such as alcohols and aldehydes, for example, pentaerythritol, by organisms such as *Flavobacterium oxydans* ATCC No. 21,245, on nutrient medium in the presence of formate ions, such as formic acid or compounds capable of providing formate ions, is disclosed.

17 Claims, No Drawings

FERMENTATION PROCESS

BACKGROUND OF THE INVENTION

1. Field of the Invention

This invention relates to an improved process for the microbial oxidation of organic compounds and to compositions useful for this purpose. In one aspect this invention relates to the microbial oxidation of polyols by the micro-organism, *Flavobacterium oxydans* ATCC No. 21,245. In another aspect, this invention relates to producing tris(hydroxymethyl)acetic acid from pentaerythritol utilizing an improved and novel nutrient medium capable of supporting the growth of said micro-organism. In yet another aspect the present invention relates to the microbiological oxidation of pentaerythritol in the presence of compounds containing formate anions.

2. Description of the Prior Art

Chemical means for oxidizing polyhydric alkanols to their respective carboxylic acids are well known. By polyhydric alkanols, it will be understood to mean an aliphatic hydrocarbon compound such as of the methane, ethane, propane series and the like containing more than two hydroxyl groups. The use of microbiological processes to oxidize pentaerythritol has not been described heretofore other than in pending U.S. application Ser. No. 727,722 of Goodhue and Schaeffer filed May 8, 1968 now U.S. Pat. No. 3,558,431 issued Jan. 26, 1971. However, in said application the production of tris(hydroxymethyl) acetic acid is effected in one aspect by employing pentaerythritol, that is, substantially pure and devoid of any traces of unreacted starting materials and oxidation by products such as formic acid. As will be readily understood by those skilled in the art, the presence of these residues, and particularly aldehydes such as formaldehyde generally inhibits the fermentation growth. Of various carbon sources needed to sustain microbiological growth none of the disclosed carbon sources referred to formic acid even though certain other organic acids were specifically disclosed such as citric acid, acetic acid, succinic acid and the like.

Further, while strong mineral acids, such as hydrochloric and sulfuric acids have been disclosed in the fermentation process of U.S. Pat. No. 3,062,723 issued Nov. 6, 1962, to Dobry et al., their use has been generally restricted solely to maintain the pH of the fermentation extract subsequent to and not during the incubation period. This is not surprising for the incidental formation and/or presence of acids as fermentation byproducts has heretofore usually been considered undesirable; and such acids have been anticipatorily controlled and neutralized by the intermittent addition, during fermentation of base materials such as ammonium hydroxide as disclosed in U.S. Pat. No. 3,093,552 issued June 11, 1963 to Perlman et al.

While still certain other acids have been used in various fermentation processes, these acids are usually fatty acids having at least 14 carbon atoms such as is disclosed in U.S. Pat. No. 2,823,171 issued Feb. 11, 1958 to Fried et al. No reference has been discovered heretofore which teaches the use of formic acid as a carbon source in an aerobic fermentation process. Quite to the contrary, U.S. Pat. No. 2,695,864 issued Nov. 30, 1954 specifically excludes formate compounds and labels them instead as carbon compounds incapable of supporting growth.

By the term formate anion-containing compound it will be understood to mean compounds containing a

radical or anion such as formic acid or compounds capable of providing such radicals, for example, esters of formic acid or other such salts or soluble compounds, oxidation products such as those from formaldehyde and the like.

The chemical art and, in particular, the fermentation art would be enhanced by improved microbiological means for oxidizing organic materials from the growth media of microbiological organisms. We have now discovered a means for producing various acids, such as tris(hydroxymethyl)acetic acid, in high yields at relatively low cost, with little risk of danger.

SUMMARY OF THE INVENTION

In one aspect of our invention we have unexpectedly found an improved method for the microbiological oxidation of organic compounds which method comprises oxidizing carbon compounds such as aliphatic, aromatic and alicyclic alcohols and aldehydes. Such materials can be saturated or unsaturated, straight or branch chain as further described herein. The present novel improvement is particularly effective in oxidizing alcohols, e.g., polyhydric alkanols containing up to about 18 carbon atoms and more particularly branched-chain compounds containing at least one primary alcohol group. Such polyols, exemplified by pentaerythritol, form their respective carboxylic acids by the oxidizing action of organisms, such as *Flavobacterium oxydans* ATCC No. 21,245 on nutrient media containing said polyols. Heretofore, oxidation of alcohols, such as, for example, pentaerythritol was achieved in formic acid-free environment and it was believed necessary to purify the alcohols so used, such as pentaerythritol, to substantially remove said acid. However, by our improved process disclosed hereafter, we are now able to provide a greater yield of carboxylic acids from their precursor polyols when this oxidation process is conducted in the presence of formic acid and other formate ion containing compounds.

By the novel process of our invention, significant and increased yields are obtained by employing the growth supporting additive, formic acid and/or its salts as a carbon source for the oxidizing micro-organism. These higher yields make it economically feasible to employ the thus-generated tris(hydroxymethyl) acetic acid in a variety of ways. For example, esterification of said acid produces various alkyl esters such as the methyl, ethyl, butyl, propyl esters and the like, of tris(hydroxymethyl) acetic acid. These esters are used to great advantage as intermediates in the preparation of photographic chemicals, and more particularly, developing agents for light-sensitized, latent image-containing photographic elements.

In addition, the tris(hydroxymethyl)acetic acid thus produced by our novel reaction, can be further reacted with a large number of compounds such as aldehydes and ketones, for example. These typically include various alkyl aldehydes and arylaldehydes such as isobutyraldehyde, formaldehyde, benzaldehyde, terephthaldehyde, and the like and aryl and alkylketones such as butanone-2, acetone, cyclohexanone and the like. Of particular interest is the benzaldehyde acetal, 2-phenyl-5-carboxy-5-hydroxymethyl-1, 3-dioxane which is homo-polymerizable either directly or indirectly through the corresponding lactone producing a linear rather than the expected three-dimensional polymer.

These low molecular weight acid-derivatives, such as the acetals and ketals for example, are conveniently used as plasticizers for various polymeric addenda and gelatin emulsion additives for photographic use.

These low molecular weight acid-derivatives, such as the acetals and ketals for example, are conveniently used as plasticers for various polymeric addenda and gelatin emulsion additives for photographic use.

In addition the benzaldehyde acetal of tris(hydroxymethyl)acetic acid is the source of a variety of other compounds such as a polymerizable lactone, various esters and the like. The latter group includes a sulfite ester which is desirable for many uses, such as a silver halide complexing agent.

The tris(hydroxymethyl)acetic acid per se produced according to our invention, has a variety of uses, such as for RWte ester which is desirable for many uses, such as a silver halide complexing agent.

The tris(hydroxymethyl)acetic acid per se produced according to our invention, has a variety of uses, such as for example; a noncalorific acidulant for foods, beverages and the like; a chelating agent for control of metal ion concentrations in both biological and chemical systems. It may be appended to developers or dyes used in photographic, textile and printing processes and the like to function as a water-solubilizing group or it can be used as an acid catalyst, such as for example in the curing of synthetic resins, such as those used in the phenol-formaldehyde type.

OBJECTS

It is, therefore, an object of our invention to provide a method for microbially oxidizing organic compounds such as alcohols or aldehydes in the presence of compounds containing formate radicals or cations. It is still another object to provide an improved process employing the organism, *Flavobacterium oxydans*, ATCC No. 21,245, in which said organism is grown on a nutrient medium in the presence of formic acid whereby polyhydric alcohols, such as those contained in crude pentaerythritol liquors, are converted to their carboxylic acids directly, obviating any costly and time-consumming intermediate purification steps.

It is yet another object of our invention to provide fermentation media which are resistant to the common infestations of airborne micro-organisms.

It is still another object of our invention to provide an unexpectedly desirable use of cheap, crude pentaerythritol-containing liquors.

Still other objects will become apparent to those skilled in the art from the following claims, examples and general disclosure.

DESCRIPTION OF THE PREFERRED EMBODIMENTS

One preferred embodiment of our invention comprises an aerobic fermentation process in which a micro-organism is cultivated in a nutrient medium in the presence of compounds having a formate anion as a carbon source supporting, wholly or in part, the growth of said organism.

Another preferred embodiment of our invention comprises a microbiological oxidation process which comprises aerobically oxidizing an organic compound with a micro-organism *Flavobacterium oxydans* ATCC No. 21,245, in a nutrient medium which supports growth of said micro-organism in the presence of a formate anion containing compound.

Another preferred embodiment of our invention comprises a process for microbiologically oxidizing a tetrahydric alcohol such as pentaerythritol and its analogs, which process comprises aerobically growing cells of the oxidizing micro-organism *Flavobacterium oxydans* ATCC No. 21,245 in the presence of formic acid in an aqueous nutrient medium, said medium comprising carbon sources capable of supporting the growth of said micro-organisms.

The carbon compounds oxidized in accordance with the present improved process can be those containing at least one primary alcohol unit and preferably alkanols, e.g., polyhydric alkanols such as pentaerythritol. These alcohols are generally present in the nutrient medium in amounts of from about 0.5 to about 10 percent by weight and preferably about 1 to about 6 percent by weight per liter of medium. It is found that said 10 percent is the equivalent needed to insure a saturated solution of pentaerythritol at a temperature of about 30° C.

Unlike previous teachings, the novel carbon-containing substrates and energy sources employed in the process of our invention include formic acid and various other compounds comprising the formate anion as previously described.

While said formates are most preferably used as the sole carbon source, they can also be used advantageously in various combinations with conventional energy sources such as acetic acid, glucose, glycerol, succinic acid, ethylene glycol, citric acid and the like. Generally the concentration of carbon sources required to allow sufficient organism growth is from about 0.1 percent to about 1.0 percent and preferably about 0.2 percent by weight of nutrient medium.

As will be obvious to those skilled in the art, the fermentation medium contains, in addition to the foregoing materials and particularly compounds having the formate anion, mineral salts on which the organism can grow and should also contain an available source of nitrogen, phosphorous, and sulfur, and, in addition, ferric, manganous and like ions as well as other trace metal ions. Suitable examples of these ions are in such compounds as ammonium nitrate, potassium diphosphate, ferrous sulfate, magnesium sulfate and the like diluted with a sufficient volume of water and adjusted to a pH of about 5.5 to 8.5 and preferably a pH of about 7.2 to 7.6. In addition to the foregoing nutrients, we have found that the rate of production of acid such as tris(hydroxymethyl)acetic acid can be further increased somewhat if growth-stimulating materials are added such as yeast extract at concentrations of about 0.1 to about 0.3 and preferably 0.2 gram per liter. Other suitable growth-stimulating materials which are also used include such substances such as pure vitamin mixtures, distillers solubles, corn steep liquors and the like. It will be understood by those skilled in the art that nitrogen can be provided by numerous sources such as by dried yeast extract in a concentration of about 1 percent. At this level the yeast extract also supplies such other nutrients as sulfate, phosphate and various metal ions. Included in this general class of nutrients is cotton seed meal and soybean meal, for example. Additional simple sources of nitrogen are glutamic acid, glutamine, aspartate, urea, nitrate ions, and combinations thereof including said glutamic acid with asparagine, for example, but other nitrogen sources are equally suitable.

The micro-organism employed in the process of this invention is capable of oxidizing various organic compounds, preferably alcohols and substances containing in part, said alcohols such as polyhydric alkanols, e.g., pentaerythritol to their carboxylic acids while simultaneously utilizing carbohydrates or some other common carbon energy source to support their growth. One micro-organism particularly effective in this regard is designated as *Flavobacterium oxydans*. A culture of a strain of said micro-organism has been deposited with the American Type Culture Collection in Washington, DC under the accession number ATCC No. 21,245. Subcultures of said micro-organism can be obtained from said depository upon request and are available generally to the public under said accession number.

Among the various alcohol-containing substances which are particularly useful in the practice of our invention are those pentaerythritol-containing crude liquors which are commercially available from a variety of reactions and which liquors contain a significant concentration of formate ion containing compounds such as formic acid.

For example, pentaerythritol is made chemically in a number of ways, one preferred method of which involves the reaction among 5 moles of formaldehyde, one mole of formic acid, and ½ mole of calcium hydroxide whereby one mole of pentaerythritol and ½ mole of calcium formate are obtained. The latter main byproduct is obtained in the theoretical reaction in which one mole of formate ion per mole of pentaerythritol are involved. In another sense it can be stated that formate anion is present in crude pentaerythritol in a range of from about 3 percent to about 5 percent and more nearly about 3.4 percent to about 4.9 percent. However, as a practical matter other products are found in crude liquors. These include predominantly (1) dipentaerythritol, present in a concentration range of about 5 percent to about 15 percent of the total pentaerythritol and (2) still smaller amounts of tri- and (3) tetra-pentaerythritol, and (4) methyl ethers and formals of pentaerythritol.

Under normal procedures, the crude or strippable liquors used in the fermentation medium must be first diluted, such as with water to reduce the pentaerythritol concentration to about 6 percent in order to reduce the formic acid to about a corresponding 2 percent. Calculated on a weight basis, these values become about 2 percent and about 0.7 percent respectively. As a practical matter, we have found that in order to reduce the formic acid concentration to about 1 percent, a crude liquor containing about 15 percent pentaerythritol would have to be diluted to about 1:5.2 parts.

Heretofore, it had been necessary to purify such crude alcoholic liquors to remove said formates and formic acid. The present novel process, therefore, obviates this time-consuming and costly step and still further provides the extraordinary and highly desirable carbon source required for higher yields of tris(hydroxymethyl)acetic acid. In another aspect, compounds containing the formate anion can be added to the nutrient medium in addition to the crude pentaerythritol liquors. Of course, if no such crude liquors are used, the formate anion-containing compounds can be easily added to the fermentation broth in any convenient manner such as simple admixture, solution or the like. By this process we have also reduced and virtually eliminated, from the nutrient media, the infestations of airborne micro-organisms which commonly contaminate media containing other carbon sources such as acetic acid, citric acid and the like.

The process of this invention is desirably effected at a temperature of from about 20° C. to about 37° C. and preferably from 28° to 30° C. under aerobic conditions. Stirring is desirable although agitation can also be used, for example, in shaking flasks or other suitable means.

Micro-organism growth rates are unexpectedly and conveniently controlled by varying the conditions of temperature, aeration and inoculum size and state. In nutrient rich media micro-organism growth rates below maximum allow a maximum induction of oxidizing enzymes. In particular, the growth rate in stirred fermentors, for example, is easily controlled by reducing the temperature from 30° C. to about 22° C. to about 24° C. and preferably to about 23° C. In addition, we use low aeration rates, that is, from about 0.10 to about 0.14 and preferably 0.12 volume of air per volume of medium per minute.

We have also found it advantageous to use inocula from the middle of the logarithmic growth phase, that is, in the period from about 40 to about 72 hours of growth and preferably about 48 hours of growth. This rate of growth produces pentaerythritol enzyme induction very nearly to the maximum amount so that from about 50 percent to about less than 100 percent and more nearly about 97 percent of the alcohol is generally oxidized to tris(hydroxymethyl)acetic acid. This oxidation is accompanied by a corresponding disappearance of pentaerythritol of which very little is lost to side reactions. While there is an early rise in the pH value of the nutrient medium from about 7.0 to about 8.0 followed by a decrease to about 5.6 as the tris(hydroxymethyl)acetic acid accumulates, the pH is generally maintained in a range from about 3.0 to about 9.5, and preferably about 6.0 to about 8.0.

Generally, the growth of the culture occurs during the first 3 days of incubation but thereafter the culture remains in a stationary growth phase during which time, however, oxidation continues. We neutralize the oxidation product, e.g., tris(hydroxymethyl)acetic acid thus formed in the nutrient medium, with a suitable base such as $K_2CO_3$ or $CaCO_3$, for example. By adding stepwise pentaerythritol to that already present in a concentration of from about 1 to 3 percent so that a total of about 10 percent is present and preferably about 6 percent pentaerythritol by weight, we have obtained yields of up to 64 grams per liter (97 percent of theoretical).

A variety of methods can be used to obtain pure oxidation product, e.g., tris(hydroxymethyl)acetic acid. One such way is to centrifuge the whole culture broth including the micro-organisms thereby removing said micro-organisms. The resulting broth is then neutralized to pH 7.0, for example, with KOH, NaOH, lime and the like. This neutral broth is then contacted with an ion exchange resin and the acid is adsorbed thereon prior to its being eluted with an aqueous acid solution. Another such way employs the use of a strongly basic anion exchange resin. Elution is preferably completed with formic acid.

The oxidation product, e.g., tris(hydroxymethyl)acetic acid, is readily recovered from the aqueous solution, for example, by evaporating it to dryness under favorable conditions. The resulting product can, if one so desires, be further purified, by recrystallization, for example, from an organic solvent, such as ethanol, benzene or isopropanol, or from a mixture of solvents such as ethanol-benzene, for example.

A particularly effective and novel way utilizes the steps of first separating the fermentation broth from the bacteria by centrifugation; then evaporating the thus-centrifuged liquors to a substantially solid residue at a temperature of about 50° C. at reduced pressure such as is achieved using a water aspirator vacuum; next refluxing a suspension of the solid residue in a suitable solvent such as an alkanol or a higher alcohol and preferably butanol with an acid catalyst such as sulfuric acid or the like in a preferred molar ratio of about 10 to 1; removing the unreacted solvent, from the refluxed mixture and finally, distilling the remainder of the refluxed mixture to obtain the respective alkyl ester, such as for example, butyl tris(hydroxymethyl)acetate.

Of course, a variety of suitable alternatives to the above recovery process are contemplated such as the acidification of the centrifuged broth prior to evaporation, after which the solid residue is then treated in the usual manner prior to esterification. Still other examples of derivatizing reactions include the conversion of tris(hydroxymethyl)acetic acid to triacetate, for example, with acetic anhydride or conversion to a mixed anhydride of the triacetate by reacting the acid with suitable acetyl compounds, such as acetyl chloride and the like.

Since the biological oxidation of carbon compounds takes place in discrete and separate steps yielding a series of intermediates and usually ending with $CO_2$ evolved, an alternative recovery procedure is of considerable use when it is necessary to decompose the carbonate which is bubbling in the exchange column when the formic acid is added. In this instance, the previously centrifuged fermentation broth is acidified to about pH 4 with a suitable acid such as formic acid; and nitrogen is bubbled through the broth for one hour. The pH of the broth is now adjusted to about pH 7 using a suitable base such as KOH or NaOH. Then the broth is again centrifuged and added to the ion exchange resin column.

The amount of oxidation product such as tris(hydroxymethyl)acetic acid in the broth can easily be determined by actual isolation of the acid and also by gas chromatographic procedures as set forth hereafter.

Variations in temperature and pressure during the various process steps include those shown and considerable variations are contemplated as is well known in the art.

In addition, while a preferred method of fermentation is disclosed herein, it will be obvious to those skilled in the art that numerous variations are possible, for example, oxidizable organic compound can be incorporated into the nutrient medium after initial incubation of the organism. Another alternative is to add the bacterial organism to a medium containing said organic compound initially. Further, said bacterial organisms can be added as inocula comprising whole cells, broken cells, cell extracts and the like in order to insure bacterial growth. Where the cells are broken, for example, various means such as physical, chemical and the like including vibrations can be used.

In practicing our invention, we have found that when *Flavobacterium oxydans* (ATCC No. 21,245) is subcultured on rich, nonexclusive nonspecific media such as a nutrient of yeast extract (1 percent) and glucose (1 percent) or the acid production medium set forth before, said micro-organism gradually loses its ability to oxidize. In order to insure that our organisms are sufficiently potent to produce a high yield of oxidation product, we have selectively picked those colonies of acid-producing strains from their cultures and maintained them thereafter. These colonies are easily distinguished 3–5 days after being spread on a pH-indicating culture medium containing pentaerythritol, by an acid-assuming color as contrasted with a nonacid-assuming color of the nonproducing strain. These colonies are picked, dispersed in a nonharmful maintenance solution such as physiological saline and spread on nutrient medium such as agar slants. After growth for 2 days at about 30° C., these cultures can be stored at reduced temperatures without any loss of potency for several months or longer. In the alternative and as only one of a number of means for storage and preservation, the cultures can be lyophilized from an aqueous suspension such as skimmed milk. When properly sealed, these cultures remain viable for extended periods of time.

In addition, we have found that the amount of tris-(hydroxymethyl)acetic acid in our fermentation broths can be determined, not only by the actual isolation of the acid in the manner above-described but also by gas chromatographic procedures.

In such procedures, the apparatus includes using a conventional gas chromatograph (thermal conductivity detector). The column is a stainless steel tube 6 feet long ⅛-inch outer diameter. The packing is 10 percent silicone gum rubber (SE-30) on Chromosorb W, a trademark of Hewlett-Packard for calcined diatomite aggregates. The helium flow is 30 ml. per minute. The injection port temperature is 295° C. and the column temperature is programmed from 120° to 265° C. at a rise in temperature of 30° C. per minute. The thermal conductivity detector is operated at 300° C. using a 150 ma. bridge current.

The procedure involves evaporating a 1 ml. sample of fermentation broth to dryness using a freeze-dry apparatus. To this residue is added 0.3 ml. of chlorotrimethylsilane 0.3 ml. of 1,1,1,3,3,3-hexamethyldisilazane and 0.3 ml. of a pyridine solution of octadecane (0.08 g. octadecane made up to 1 ml. vol. with pyridine). After standing 4 hours, the sample is analyzed by gas chromatography. Injection volumes of 1.4 to 1.6$\mu$ liters are used. The amount of tris(hydroxymethyl)acetic acid in a milliliter sample of fermentation broth is determined in the following manner.

Samples of an analytical sample of tris(hydroxymethyl)acetic acid, ranging in the size from 1 to 40 mg., are converted to their trimethylsilyl derivative. The samples are analyzed as above. A standard straight line curve is prepared by plotting the ratio of peak area of trimethylsilyl derivative to peak area of octadecane against the mg. of tris(hydroxymethyl)acetic acid in each sample.

When a sample of fermentation broth is analyzed as shown above, the value of mg. of tris(hydroxymethyl)acetic acid in the test sample on the graph corresponding to the ratio of peak area of product to peak area of octadecane is obtained.

The infrared spectrum of tris(hydroxymethyl)acetic acid and the mass spectrum of the trimethylsilylated acid prepared by microbiological oxidation of the acid are identical with the spectra obtained on a sample of the acid prepared by the platinum-catalyzed oxidation of pentaerythritol.

The following examples are included for a further understanding of the invention:

EXAMPLE I

Fermentations are conducted in a series of 125 ml. Erlenmeyer flasks with stainless steel Morton closures. An aqueous nutrient medium is employed which contains 10 g./liter of yeast extract and 20 g./liter of pentaerythritol. Formic acid is added to the nutrient medium in concentrations varying from 1 to 10 g./liter. The medium is neutralized with potassium hydroxide and subsequently sterilized by autoclaving. Each flask, containing 25 ml. of medium is innoculated with *Flavobacterium oxydans* (ATCC No. 21,245) culture approximately 0.75 mg. (dry weight), previously grown for 2 days on a nutrient slant. The flasks are agitated at 400 r.p.m. at a temperature maintained at 30° ± 1° C. and are sampled at 144 hours.

The amount of tris(hydroxymethyl)acetic acid recovered is determined by the gas chromatographic method above described. These results are shown hereafter in Table I.

| Flask No. | Formic Acid (g./liter) | Tris (hydroxymethyl) acetic acid (g./liter) | % Yield |
|---|---|---|---|
| 1 | 1 | 8.4 | 43 |
| 2 | 1 | 9.6 | 49 |
| 3 | 2 | 12.3 | 63 |
| 4 | 2 | 12.0 | 61 |
| 5 | 5 | 16.5 | 85 |
| 6 | 5 | 15.6 | 80 |
| 7 | 10 | 16.3 | 84 |
| 8 | 10 | 16.0 | 82 |

Similar good results evidenced by high percentages of yield are obtained when an equivalent concentration of formic acid is present, being derived from both a crude liquor containing pentaerythritol and the formic acid additive.

EXAMPLE II

In order to demonstrate the unexpected superiority of formic acid over other known carbon sources, such as the customarily accepted acetic acid, the same procedure set forth in Example I is repeated with the following variations: (1) formic acid and acetic acid set forth below are used in concentrations of 2 g./liter, (2) the following nutrient salts are used in concentrations as shown and added to the fermentation medium in alternate series to show the increase in yield to be a function of the formic acid only:

| | |
|---|---|
| $K_2HPO_4$ | 2 g./liter |
| $MgSO_4 \cdot 7H_2O$ | 0.25 g./liter |
| $CaCl_2 \cdot 2H_2O$ | 0.001 g./liter |
| $FeSO_4 \cdot 7H_2O$ | 0.028 g./liter |
| $MnSO_4 \cdot 7H_2O$ | 0.17 g./liter |
| $ZnSO_4 \cdot 7H_2O$ | 0.0006 g./liter |
| NaCl | 0.006 g./liter |

The results of these fermentations indicate a substantial increase of acid formed of up to about 8 percent when formic acid is used as compared to acetic acid.

| Flask No. | Carbon Source | Salts added (+) to fermentation Medium | Tris (hydroxymethyl) acetic acid g./liter |
|---|---|---|---|
| 1 | Formic acid | + | 13.0 |
| 2 | Formic acid | + | 12.9 |
| 3 | Acetic acid | + | 12.5 |
| 4 | Acetic acid | − | 12.5 |
| 5 | Formic acid | − | 12.2 |
| 6 | Formic acid | − | 12.1 |
| 7 | Acetic acid | − | 11.1 |
| 8 | Acetic acid | − | 10.9 |

Similar good results are obtained when the source of formic acid is derived from crude pentaerythritol formic acid-containing liquors either alone or in combination with formic acid additives in a total concentration as above shown.

EXAMPLE III

As indicated above, not only does the addition of or presence in the nutrient medium of formic acid increase the yield of acid formed, but it also significantly eliminates airborne micro-organism contamination. In order to demonstrate this, three nutrient agar plates are prepared as follows from the media shown:

| 1. Nutrient Medium | Conc/g./liter |
|---|---|
| Glucose | 10 |
| Yeast extract | 10 |
| $K_2HPO_4$ | 1 |
| $MgSO_4 \cdot 7H_2O$ | 0.2 |
| $FeSO_4 \cdot 7H_2O$ | 0.05 |
| $CaCl_2$ | 0.02 |
| $MnSO_4 \cdot 7H_2O$ | 0.002 |
| $NaMoO_4 \cdot 2H_2O$ | 0.001 |

2. Nutrient Medium

| | |
|---|---|
| Pentaerythritol | 20 |
| Yeast Extract | 10 |
| Acetic Acid | 2 |

3. Nutrient Medium

| | |
|---|---|
| Pentaerythritol | 20 |
| Yeast extract | 10 |
| Formic Acid | 2 |

To each neutralized medium 1, 2 and 3 (above) is added 150 agar-agar No. 3 tablets per liter after which each medium is autoclaved for 30 minutes at 121 C. and 15 pounds pressure.

These liquid media are allowed to cool to about 50 C. and 30 ml. of each medium are poured into separate Petri dishes in a sterile laminar airflow hood. After solidification these plates are dried overnight (i.e., 16–18 hours) at 37° C. Plates of all three media are opened and air-exposed for periods of 5, 10 and 20 minutes respectively. After closing, the plates are reincubated at 30° C. for 4 days with the following results:

NUMBER OF COLONIES AND THEIR SIZE

| 5-minute exposure | 10-minute exposure | 20-minute exposure |
|---|---|---|
| 1. growth inundates plate | growth inundates plate | growth inundates plate |
| 2. 1 colony (1.5 cm. diameter) | 1 colony (1.5 cm. diameter) | 1 colony (8 cm. diameter) |
| 3. 1 colony (0.5 cm. diameter) | 0 | 0 |

The invention has been described in detail with particular reference to certain preferred embodiments thereof, but it will be understood that variations and modifications can be effected within the spirit and scope of the invention.

We claim:

1. A microbiological oxidation process which comprises aerobically oxidizing a polyhydric alkanol with the micro-organism *Flavobacterium oxydans* (ATCC No. 21,245) in a nutrient medium which supports growth of said micro-organism, said medium comprising a formate anion-containing compound.

2. A process according to claim 1 in which said alkanol is a polyhydric alkanol.

3. A process according to claim 2 in which said alkanol is a tetrahydric alkanol.

4. A process according to claim 3 in which said alkanol is pentaerythritol.

5. The process according to claim 1 in which the temperature is maintained in the range of about 22° to about 24° C., aeration rate is in the range of about 0.10 to about 0.14 volume of air per volume of medium per minute and s aid micro-organism is obtained from about the 40 to about 72-hour phase of its growth.

6. The process of claim 1 wherein said formate anion-containing compound is formic acid.

7. The process of claim 1 in which said compound having a formate anion is formic acid.

8. A process comprising aerobically growing cells of the micro-organism *Flavobacterium oxydans* (ATCC No. 21,245) in a nutrient medium, said medium comprising a carbon source consisting essentially of pentaerythritol and capable of supporting growth of said micro-organism in the presence of a formate ion.

9. A process according to claim 8 in which said pentaerythritol is oxidized to tris(hydroxymethyl)acetic acid.

10. A process described in claim 8 in which said source of carbon comprises formic acid.

11. A process described in claim 8, in which said carbon source further comprises acetic acid, succinic acid, citric acid, glycerol, glucose, ethylene glycol or sucrose.

12. A process according to claim 8 whereby said micro-organism is provided by a process which comprises selectively picking acid-producing colonies of said micro-organism from a nutrient medium containing formic acid or comprising a precursor for said acid, dispersing in a maintenance solution, growing on a nutrient, medium harvesting, and storing said micro-organism.

13. The process according to claim 9 which comprises introducing said pentaerythritol initially into said nutrient medium in a concentration of about 0.5 to about 3 percent, by weight per liter, of nutrient medium and in increments thereafter until up to about 15 percent of pentaerythritol by weight per liter of nutrient medium is present.

14. The process according to claim 8 in which said nutrient medium is at a pH in the range of about 3.0 to about 9.5 and tris(hydroxymethyl)acetic acid is recovered.

15. The process of claim 8 in which the temperature of said medium is in the range of about 20° to about 37° C.

16. The process of claim 14 in which said recovery includes the steps of separating micro-organism from aqueous nutrient medium and recovering a whole broth, neutralizing said broth and recovering said tris(hydroxymethyl)acetic acid.

17. The process of claim 8 in which said formic acid is present in said nutrient medium in a concentration of about 1.0 to about 10 grams/liter of nutrient medium.

* * * * *

PO-1050
(5/69)

UNITED STATES PATENT OFFICE
CERTIFICATE OF CORRECTION

Patent No. 3642581          Dated    February 15, 1972

Inventor(s) Hugh A. Risley and Charles T. Goodhue

It is certified that error appears in the above-identified patent and that said Letters Patent are hereby corrected as shown below:

(1) Title page, second column, in the reference under the heading "OTHER PUBLICATIONS", "884812" should read ---88481z---.

(2) Column 2, lines 60-63 "These . . . use." should be deleted since it is a repetition of the preceding paragraph.

(3) Column 2, lines 69-72, "The . . . agent." should be deleted since it is in part a repetition of the subsequent paragraph, and that part that is not repetitious is incorrectly set forth.

(4) Column 8, line 48, in the line pertaining to Flask No. 4, "-" should read ---+---.

In the Claims:

(5) Column 10, line 46, "formic acid" should read ---formate ion---.

Signed and sealed this 6th day of March 1973.

(SEAL)
Attest:

EDWARD M. FLETCHER, JR.          ROBERT GOTTSCHALK
Attesting Officer                Commissioner of Patents